Patented Apr. 21, 1936

2,037,793

UNITED STATES PATENT OFFICE 2,037,793

FLUORESCENT SOLID COMPOSITION

Bernard H. Jacobson, Charleston, W. Va., assignor to Klipstein Chemical Processes, Inc., New York, N. Y., a corporation of New Jersey No Drawing. Application July 5, 1933,
Serial No. 679,078

5 Claims. (Cl. 106—22)

This invention relates in general to molding compositions or plastics and the production of transparent or translucent solid bodies.

An important object of the invention is to improve the appearance of such materials and bodies by imparting to them a particular color effect or fluorescence. This object is accomplished by incorporating with the material a small percentage of perylene or a derivative thereof.

For the purposes of the present invention the term "perylene" will be employed in the claims to indicate either perylene or a perylene derivative, as these materials have in general the class property of being soluble or miscible in many other organic compounds with the production of marked fluorescence of various colors or shades, particularly prominent in transparent or translucent plastics and the like.

I have discovered that perylene may be used to advantage in coloring or improving the appearance of many different types of plastics and similar compositions or materials of a transparent or translucent nature, such as for example natural and synthetic gums and resins, particularly celluloid, phenolic, vinyl, urea and glycerol resins, artificial silk, rayon, cellulose acetate, etc. I find that these compounds have sufficient stability to be incorporated with the raw materials and withstand the conditions attending the manufacture of a great many different materials, so that the finished solid composition or formed object will continue to exhibit the desired color and fluorescence. Thus, in the case of compositions which solidify by evaporation of volatile solvents, the fluorescence persists as a property of the solid which remains. Even in the manufacture of synthetic resins or condensation products, and the thermoplastic molding of objects, the perylene compounds withstand to a remarkable degree the treatments involved, and give to the finished product a characteristic color and fluorescent effect.

Among the perylene compounds which have been found especially suitable for a number of these uses are perylene, ketone perylene compounds such as benzoyl-perylene and aceto-perylene, nitro derivative of perylene, perylene chlorides, perylene bromides, and other derivatives. The monobrom, dibrom, tribrom and tetrachlor perylene exhibit a strong green yellow fluorescence in dilutions as great as one to one hundred thousand parts. The nitro-derivative gives a yellow to orange fluorescence in dilute solutions, and as the concentration is increased the fluorescence becomes yellow pearl-white in concentrations of one to one hundred thousand. The benzoyl-perylene and the aceto-perylene ketones give a green yellow fluorescence which is quite pronounced in dilutions as great as one part to one million, although the best shades are obtained in higher concentrations, for example, around one to two hundred fifty thousand parts.

Several of these perylene compounds are new compounds. Typical methods for their production are as follows:—

The nitroderivative of perylene may be prepared by stirring perylene in an excess of strong nitric acid. The compound produced, which is insoluble in the reaction mixture, is filtered off, washed and dried. It is soluble in most of the common organic solvents to a yellow or orange solution, depending on the concentration, and it exhibits a fluorescence which is very similar to phosphorescence. The degree of fluorescence is somewhat less in the case of the nitro-derivative of perylene than that exhibited by the ketones or halogen derivatives of perylene.

The halogen compounds of perylene may be prepared by refluxing a carbon tetrachloride solution of perylene with the halogen. As an example of this treatment one may add 25 grams of perylene and 16 grams of bromine to 200 ccs. of carbon tetrachloride and reflux this mixture while heating for sixteen hours. During this treatment there is an evolution of hydrobromic acid, and the reaction mixture at first turns dark in color. This color gradually lightens until at the end of the reaction the mixture is pale yellow. The insoluble material is filtered off and there is recovered about 31.2 grams of crude perylene bromide. The chloride can be prepared similarly by passing chlorine gas into a refluxing mixture of perylene and carbon tetrachloride. The halogen compounds of perylene are more soluble in organic solvents than perylene, and they exhibit a strong green yellow fluorescence in dilutions as great as one to one hundred thousand parts by weight.

In general, the ketone compounds may be prepared by dissolving or mixing perylene in a solvent such as benzene, to which is added a Friedel-Crafts type of condensing agent such as anhydrous aluminum chloride, after which the reacting aliphatic or aromatic substance, previously dissolved or mixed in another body of solvent such as benzene or the like, is introduced. The benzoyl compound reacts preferentially with the perylene instead of with the benzene. Heat is produced and hydrochloric acid is evolved in the ensuing reaction, and after agitation for an hour or so the reaction mixture is drowned in ice and hydrochloric acid and the product separated and recovered, in accordance with well-known practice.

For the production of a perylene ketone with benzoyl chloride, one may proceed, for example, as follows. In a one-liter beaker fitted with a stirrer, place 250 ccs. of benzene, 25 grams of perylene and 32 grams of anhydrous aluminum chloride powder. With the stirrer running slowly, add 16 grams of benzoyl chloride. There is an immediate reaction with evolution of hydrochloric acid gas and the reaction mixture warms slightly, turning almost black in color. The reaction proceeds quietly and satisfactorily without heating, although in the case of benzoyl chloride, it is thought best to heat the mixture for about one hour in order to complete the reaction. Good yields can be obtained from the other acyl compounds without heating. After all the reagents are mixed, they are allowed to agitate for about thirty minutes and then the whole mass is dumped into 150 grams of ice and 20 grams of muriatic acid. This mixture separates into two layers; a lower, clear layer containing the aluminum chloride in aqueous solution, and a brown upper layer which contains the benzene and the ketone partly in solution. This mixture can be worked up in any of the usual methods of handling this type of synthesis. For instance, the whole mixture may be boiled to evaporate the excess benzene, then cooled and filtered. The filtered ketone is a brown solid which, after thorough washing with cold water and drying, will be found to weigh about 40 grams. The product at this point is impure and it can be purified by recrystallization from an organic solvent, such as monochlorbenzene. The recrystallized product is golden yellow in color and has a melting point of 298.8° C., uncorrected. The original perylene has a melting point of 274.5° C., uncorrected.

Aceto-perylene may be produced, for example, from either acetic anhydride or acetyl chloride and perylene. Using acetic anhydride, one may proceed as follows:—37.5 grams of perylene are introduced into 300 ccs. of benzene, and then 45 grams of anhydrous aluminum chloride powder is added. A mixture made up of 15.3 grams of acetic anhydride and 75 ccs. of benzene is then run slowly into the former mixture while stirring. During the addition of the acetic anhydride benzene mixture, reaction commences and proceeds vigorously with the evolution of hydrochloric acid gas, the temperature rising to 50 to 60° C. When all the acetic anhydride benzene mixture has been introduced, the reaction mass is gently heated up to about 70° C. until the evolution of hydrochloric acid gas has practically stopped. After about one hour the mass is drowned in a mixture of ice water and hydrochloric acid. Benzene is then driven off by heat, the remaining product filtered and washed with dilute sodium carbonate and then with plain water, after which the product is dried in the vacuum. A yield of about 48 grams of the crude material is thus obtained. The product is somewhat difficult to purify by crystallization, but satisfactory crystals are obtained by boiling the crude aceto-perylene with methanol, filtering off the insoluble part and washing with methanol, after which the product is dried. This is then dissolved in monochlorbenzene, from which solution the purified product may then be crystallized. A second crop of crystals may also be obtained in this way.

The aceto-perylene thus obtained is in the form of fine dark brown crystals, of a melting point in the neighborhood of 210° C., very soluble in monochlorbenzene, but only slightly soluble in benzene and gasoline. Its solutions and plastic compositions, into which it is introduced, exhibit a marked green fluorescence.

In the manufacture of formed bodies of synthetic resins and similar plastics, the perylene compound may be used in quite variable proportions, if desired, even up to one part per hundred by weight, but marked fluorescent effects are obtained in considerably lower concentrations. The perylene compound may be introduced during the liquid or semi-liquid state, either in the form of a dry powder or in a compatible solvent or in a plasticizer. The effects are very marked in transparent and translucent resins generally, and particularly so in nitrocellulose and vinyl compositions. Very good results have been obtained in vinyl resins, for example, with the use of 1 part by weight of benzoyl perylene to 5,000 parts of the resin, the composition being converted by heat in molds to obtain the desired formed body or object. Bodies thus produced show a pleasing yellow-green fluorescence. As previously noted, the perylene compounds satisfactorily withstand the thermoplastic treatments during the manufacture or conversion of the synthetic resins.

It is intended in the foregoing illustrations not to limit the invention to any particular proportions or any particular method of incorporating the perylene compound with the composition. Those skilled in the art will readily adapt the quantities or proportions of the various ingredients to obtain the effects in the desired degree. Obviously, any of the conventional methods for incorporating color may be followed in introducing the perylene compound. It is furthermore to be noted that two or more of the perylene compounds may be used together, or one or more of them may be used with any other desired fluorescent material, color or dyestuff, for example, within the scope of this invention.

I claim:—

1. A formed body comprising a solid plastic at least partially penetrable to light, and a small addition of a perylene compound to impart a fluorescent color effect to the body.

2. A formed body comprising a solid plastic at least partially penetrable to light, and a small addition of a keto-perylene compound to impart a fluorescent color effect to the body.

3. A formed body comprising a solid plastic at least partially penetrable to light, and a small addition of a benzoyl-perylene compound to impart a fluorescent color effect to the body.

4. A formed body comprising a solid plastic at least partially penetrable to light, and a small addition of an aceto-perylene compound to impart a fluorescent color effect to the body.

5. A formed body comprising a solid plastic at least partially penetrable to light, and a small addition of a nitro derivative of perylene to impart a fluorescent color effect to the body.

BERNARD H. JACOBSON.